United States Patent
Kim et al.

(10) Patent No.: US 10,998,813 B2
(45) Date of Patent: May 4, 2021

(54) MODULAR MULTI-LEVEL CONVERTER AND DC FAILURE BLOCKING METHOD THEREFOR

(71) Applicants: HYOSUNG HEAVY INDUSTRIES CORPORATION, Seoul (KR); Hee Jin Kim, Seoul (KR); Kyeon Hur, Seoul (KR)

(72) Inventors: Hee Jin Kim, Seoul (KR); Dong Su Lee, Anyang-si (KR); Kyeon Hur, Seoul (KR); Jae Sik Kang, Seoul (KR); Sang Min Kim, Seoul (KR); Jong Seo Na, Seoul (KR)

(73) Assignees: HYOSUNG HEAVY INDUSTRIES CORPORATION, Seoul (KR); Hee Jin Kim, Seoul (KR); Kyeon Hur, Seoul (KR)

( * ) Notice: Subject to any disclaimer, the term of this patent is extended or adjusted under 35 U.S.C. 154(b) by 146 days.

(21) Appl. No.: 16/067,543

(22) PCT Filed: Jun. 23, 2016

(86) PCT No.: PCT/KR2016/006720
§ 371 (c)(1),
(2) Date: Jun. 29, 2018

(87) PCT Pub. No.: WO2017/115955
PCT Pub. Date: Jul. 6, 2017

(65) Prior Publication Data
US 2019/0312504 A1 Oct. 10, 2019

(30) Foreign Application Priority Data

Dec. 30, 2015 (KR) .................. 10-2015-0190365

(51) Int. Cl.
*H02M 1/32* (2007.01)
*H02M 7/483* (2007.01)
(Continued)

(52) U.S. Cl.
CPC ............ *H02M 1/36* (2013.01); *H02H 7/1257* (2013.01); *H02M 1/32* (2013.01); *H02M 7/493* (2013.01);
(Continued)

(58) Field of Classification Search
CPC .. H02M 1/32; H02M 1/36; H02M 2007/4822; H02M 2007/4835;
(Continued)

(56) References Cited

U.S. PATENT DOCUMENTS

| 2011/0080758 A1* | 4/2011 | Asplund | H02J 3/36 363/35 |
| 2011/0235375 A1* | 9/2011 | Dommaschk | H02H 7/1257 363/54 |

(Continued)

FOREIGN PATENT DOCUMENTS

| CN | 104009446 A | 8/2014 |
| CN | 102931863 B | 4/2015 |

(Continued)

*Primary Examiner* — Thienvu V Tran
*Assistant Examiner* — Ivan Laboy
(74) *Attorney, Agent, or Firm* — Novick, Kim & Lee, PLLC; Jae Yoon Kim

(57) ABSTRACT

A modular multilevel converter (MMC) includes multiple converter arms, each converter arm having: N submodules connected to each other in series, N being an integer equal to or greater than 2; and a circuit opening unit connected to the N submodules in series to open a circuit of the converter arm, wherein the N submodules has n submodules including full-bridge circuits and N–n submodules including half-bridge circuits, n being less than N.

5 Claims, 6 Drawing Sheets

(51) Int. Cl.
*H02M 7/49* (2007.01)
*H02M 7/493* (2007.01)
*H02M 1/36* (2007.01)
*H02M 7/5387* (2007.01)
*H02H 7/125* (2006.01)
*H02M 7/48* (2007.01)

(52) U.S. Cl.
CPC .......... *H02M 7/5387* (2013.01); *H02M 7/483* (2013.01); *H02M 7/49* (2013.01); *H02M 2007/4822* (2013.01); *H02M 2007/4835* (2013.01)

(58) Field of Classification Search
CPC ........ H02M 7/483; H02M 7/49; H02M 7/493; H02M 7/5387; H02M 2001/322; H02M 2001/325; H02H 7/1257
See application file for complete search history.

(56) References Cited

U.S. PATENT DOCUMENTS

| | | | | |
|---|---|---|---|---|
| 2013/0308235 | A1* | 11/2013 | Davies | H02H 7/1257 361/62 |
| 2015/0003134 | A1 | 1/2015 | Trainer | |
| 2015/0357905 | A1* | 12/2015 | Nami | H02M 1/32 363/53 |
| 2016/0013716 | A1* | 1/2016 | Hur | H02M 1/32 363/50 |
| 2016/0308458 | A1* | 10/2016 | Jimichi | H02M 1/32 |
| 2017/0047727 | A1* | 2/2017 | Cao | H02M 1/32 |
| 2017/0163170 | A1* | 6/2017 | Tahata | H02J 5/00 |
| 2017/0310237 | A1* | 10/2017 | Uda | H02M 7/217 |
| 2018/0115253 | A1* | 4/2018 | Whitehouse | H02M 7/483 |
| 2018/0183231 | A1* | 6/2018 | Xie | H02H 7/12 |
| 2018/0212533 | A1* | 7/2018 | Nami | H02M 1/32 |

FOREIGN PATENT DOCUMENTS

| | | | |
|---|---|---|---|
| EP | 2671297 A1 | 11/2013 | |
| JP | 2013-027260 A | 2/2013 | |
| KR | 10-2013-0006613 A | 1/2013 | |
| KR | 10-1512188 B1 | 4/2015 | |
| KR | 10-1548840 B1 | 8/2015 | |
| KR | 10-1558862 B1 | 10/2015 | |
| WO | 2012103936 A1 | 8/2012 | |
| WO | 2012/116738 A1 | 9/2012 | |
| WO | 2012116738 A1 | 9/2012 | |
| WO | WO-2015067322 A1 * | 5/2015 | ............. H02M 1/32 |
| WO | 2015/124176 A1 | 8/2015 | |
| WO | 2015124176 A1 | 8/2015 | |

* cited by examiner

MODULAR MULTI-LEVEL CONVERTER AND DC FAILURE BLOCKING METHOD THEREFOR

TECHNICAL FIELD

The present invention relates to a modular multilevel converter (MMC). More particularly, the present invention relates to a MMC and a DC failure blocking method therefor, the MMC and the method being capable of DC failure blocking and reducing loss using a combination of half-bridge submodules and full-bridge submodules for converter arms of the MMC.

BACKGROUND ART

A modular multilevel converter (MMC) is a type of multilevel converter which is composed of multiple submodules (SMs). The modular multilevel converter (MMC) is capable of producing high voltage output and large capacity output that a multi-converter has, and of adjusting the output voltage with a stepped output.

Such a MMC is simple in structure, compared to a general multilevel converter, and spare submodules may be used to extend life expectancy.

FIG. 1 is a diagram illustrating a configuration of a general MMC.

Referring to FIG. 1, the MMC is composed of, for example, three legs 13a, 13b, and 13c and six arms 11a, 11b, 11c, 12a, 12b, and 12c, and each arm includes multiple submodules (SMs). These arms are upper arms 11a, 11b, and 11c and lower arms 12a, 12b, and 12c. The figure, as an example, illustrates four submodules (SMs) for each arm, but the number of submodules (SMs) may be changed.

The MMC converts a DC-side input voltage (Vdc) input via a bus into an AC-side output voltage through the three legs 13a, 13b, and 13c. The output voltage differs depending on on/off-state of the submodules (SMs) included in each arm. That is, when each of the upper and lower arms includes, for example, four submodules, the output voltage is adjusted at five levels (the number of submodules+1) depending on the number of submodules (SMs) that remain in the on-state. Here, in order to adjust the output voltage, on/off of a switch of the submodule (SM) of each arm may be controlled.

FIG. 2 is a diagram illustrating an example of a configuration of a submodule of a general MMC.

Referring to FIG. 2, each submodule (SM) includes a so-called half-bridge circuit having a pair of power semiconductors 21 and a capacitor 22 connected in parallel to the power semiconductors 21. The power semiconductor 21 includes a power semiconductor element 21a and a diode 21b connected thereto in inverse-parallel.

However, in a conventional MMC, there are many countermeasures against AC failure, but there are few countermeasures against DC failure. That is, in the case of a conventional submodule composed of a half-bridge circuit, when the DC failure occurs, the fault current flows from the AC side only to the diode 21b, and thus the fault current cannot be blocked. Thus, in order to block the fault current, a conventional submodule composed of a full-bridge circuit has been proposed.

FIG. 3 is a diagram illustrating another example of a configuration of a submodule of a general MMC.

Referring to FIG. 3, each submodule (SM) includes a so-called full-bridge circuit having power semiconductors 31 in two pairs connected to each other in parallel and a capacitor 32 connected in parallel to the power semiconductors 31. The power semiconductor 31 includes a power semiconductor element 31a and a diode 31b connected thereto in inverse-parallel.

As described above, in the case of the submodule composed of the full-bridge circuit, when DC failure occurs, the reverse voltage is applied to a capacitor 33 inside due to the fault current from the AC side such that the fault current is blocked. However, the loss caused by switching operation of an IGBT 31 increases. In practice, when submodules with respect to the same number thereof are composed of full-bridge circuits, compared to half-bridge circuits, about 30% or more of switching loss occurs.

DISCLOSURE

Technical Problem

Accordingly, the present invention has been made keeping in mind the above problems occurring in the related art, and an object of the present invention is to provide a MMC composed of multiple submodules with a suitable number of full-bridge circuits and half-bridge circuits so as to be capable of DC failure blocking and reducing loss.

Technical Solution

According to the present invention, there is provided a modular multilevel converter (MMC) including multiple converter arms, each converter arm having: N (N≥2, an integer) submodules connected to each other in series; and a circuit opening unit connected to the N submodules in series to open a circuit of the converter arm, wherein the N submodules are n (n<N) submodules including full-bridge circuits and N-n submodules including half-bridge circuits.

In the present invention, when DC failure of the MMC occurs, power semiconductors in the full-bridge circuits and the half-bridge circuits of the submodules may be turned off, and a DC fault current in the converter arm may be zero during the particular time (T).

In the present invention, during the particular time (T), the circuit opening unit may operate to open the circuit of the converter arm.

In the present invention, the particular time (T) may be proportional to a number (n) of the submodules including the full-bridge circuits, and the number (n) of the submodules including the full-bridge circuits may be set in such a manner that the particular time (T) is longer than an operation time of the circuit opening unit.

In the present invention, a number (n) of the submodules including the full-bridge circuits may be set in such a manner that a voltage stored in capacitors of the full-bridge circuits is less than a peak value of a three-phase line voltage at an AC side of the MMC.

In the present invention, the circuit opening unit may include a disconnector that operates when the DC fault current in the converter arm is zero.

In the present invention, the circuit opening unit may include one or more power semiconductors connected to each other in series, and the power semiconductors of the circuit opening unit may be placed in a reverse direction to the power semiconductors in the submodules.

In the present invention, when the DC fault current in the converter arm is within a preset range from zero, the power semiconductors of the circuit opening unit may be turned off, such that the DC fault current in the converter arm is blocked.

In the present invention, the circuit opening unit may include: a disconnector that operates when the DC fault current in the converter arm is zero; and one or more power semiconductors connected to each other in series, the power semiconductors being connected to the disconnector in series, and the power semiconductors of the circuit opening unit may be placed in a reverse direction to the power semiconductors in the submodules, and may be turned off when the DC fault current in the converter arm is within a preset range from zero, such that the DC fault current in the converter arm is blocked.

Also, according to the present invention, there is provided a DC failure blocking method for a modular multilevel converter (MMC) including multiple converter arms, each converter arm having: N (N≥2, an integer) submodules connected to each other; and a circuit opening unit connected to the N submodules in series to open a circuit of the converter arm, wherein the N submodules are n (n<N) submodules having full-bridge circuits and N-n submodules having half-bridge circuits, the method including: recognizing, by a controller, DC failure of the MMC; turning off, by the controller, power semiconductors in the full-bridge circuits and the half-bridge circuits of the submodules; and operating, by the controller, the circuit opening unit to open the circuit of the converter arm and to block a DC fault current caused by the DC failure when the DC fault current in the converter arm is zero or within a preset range from zero.

In the present invention, the circuit opening unit may operate during a particular time (T) in which the DC fault current in the converter arm remains at zero or within the preset range from zero.

In the present invention, the particular time (T) may be proportional to a number (n) of the submodules including the full-bridge circuits, and the number (n) of the submodules including the full-bridge circuits may be set in such a manner that the particular time (T) is longer than an operation time of the circuit opening unit.

In the present invention, the circuit opening unit may include a disconnector that operates when the DC fault current in the converter arm is zero.

In the present invention, the circuit opening unit may include one or more power semiconductors connected to each other in series and placed in a reverse direction to the power semiconductors in the submodules, and the power semiconductor of the circuit opening unit may be turned off when the DC fault current in the converter arm is within the preset range from zero, such that the DC fault current in the converter arm is blocked.

Advantageous Effects

As described above, according to the present invention, in the MMC, the multiple submodules are a combination of full-bridge submodules and half-bridge submodules. Thus, when the DC failure of the MMC occurs, the fault current is blocked, whereby internal elements of the submodules may be prevented from being damaged by the DC fault current.

Also, according to the present invention, compared to a conventional full-bridge submodule having the same effect, implementation costs are reduced by using fewer IGBTs and diodes. Furthermore, a switching operation does not occur at all times, and thus switching loss decreases.

Also, according to the present invention, the voltage stored in the capacitor in the submodule of the MMC is prevented from discharging, and thus quick restarting is possible after removal of the DC failure.

MODE FOR INVENTION

Figure 1:
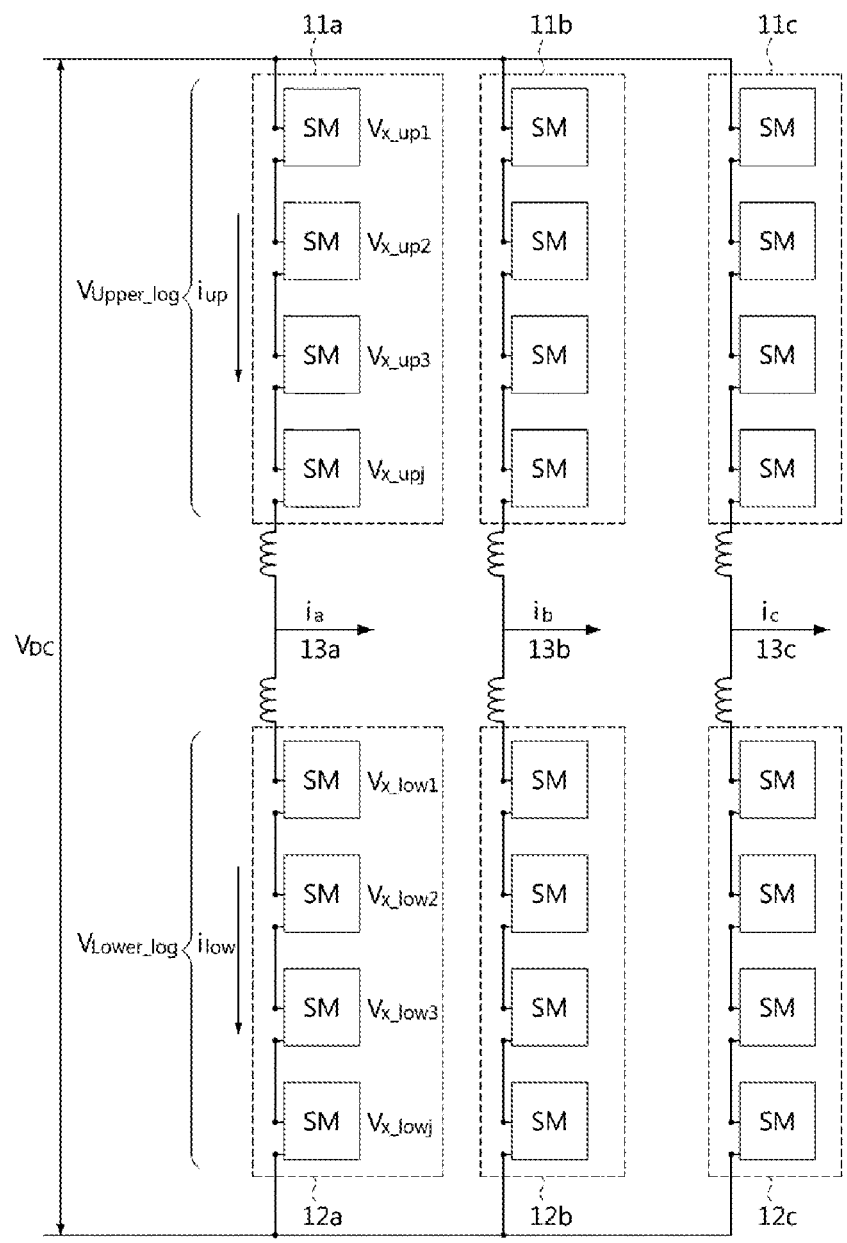
FIG. 1 is a diagram illustrating a configuration of a general MMC.
Figure 2:
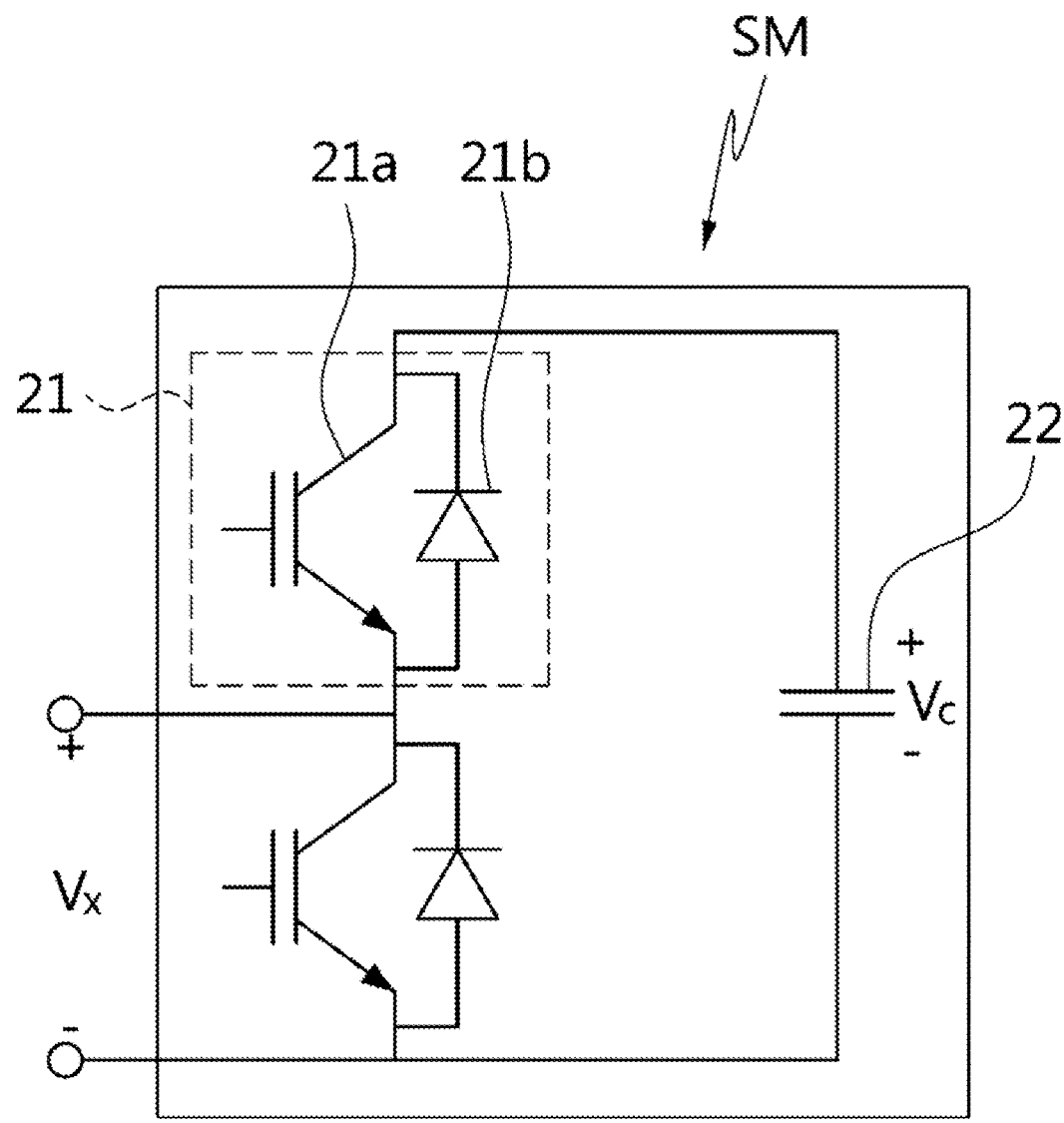
FIG. 2 is a diagram illustrating an example of a configuration of a submodule of a general MMC.
Figure 3:
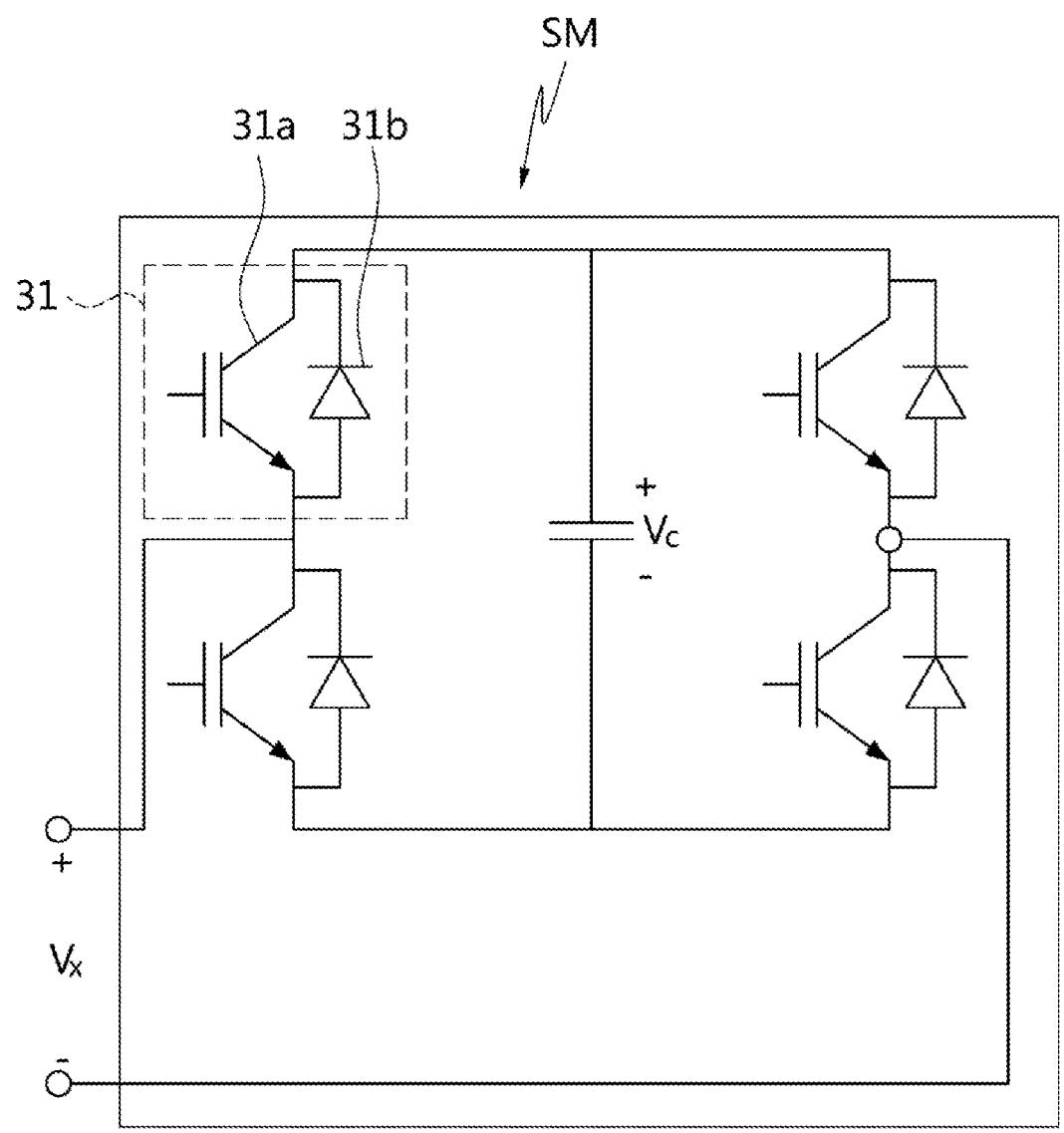
FIG. 3 is a diagram illustrating another example of a configuration of a submodule of a general MMC.

Hereinafter, embodiments of the present invention will be described in detail with reference to the illustrative drawings. It is noted that in assigning reference numerals to elements in the drawings, the same reference numerals designate the same elements throughout the drawings although the elements are shown in different drawings. Also, in describing embodiments of the present invention, the detailed descriptions of known related constitutions or functions thereof may be omitted if they make the gist of the present invention unclear.

Further, when describing the elements of the present invention, terms such as first, second, A, B, (a), (b), etc. may be used. Since these terms are provided merely for the purpose of distinguishing the elements from each other, they do not limit the nature, sequence or order of the elements. When an element is "coupled to", "combined with", or "connected to" another element, it can be directly coupled to the other element or intervening elements may be present therebetween.

Figure 4:
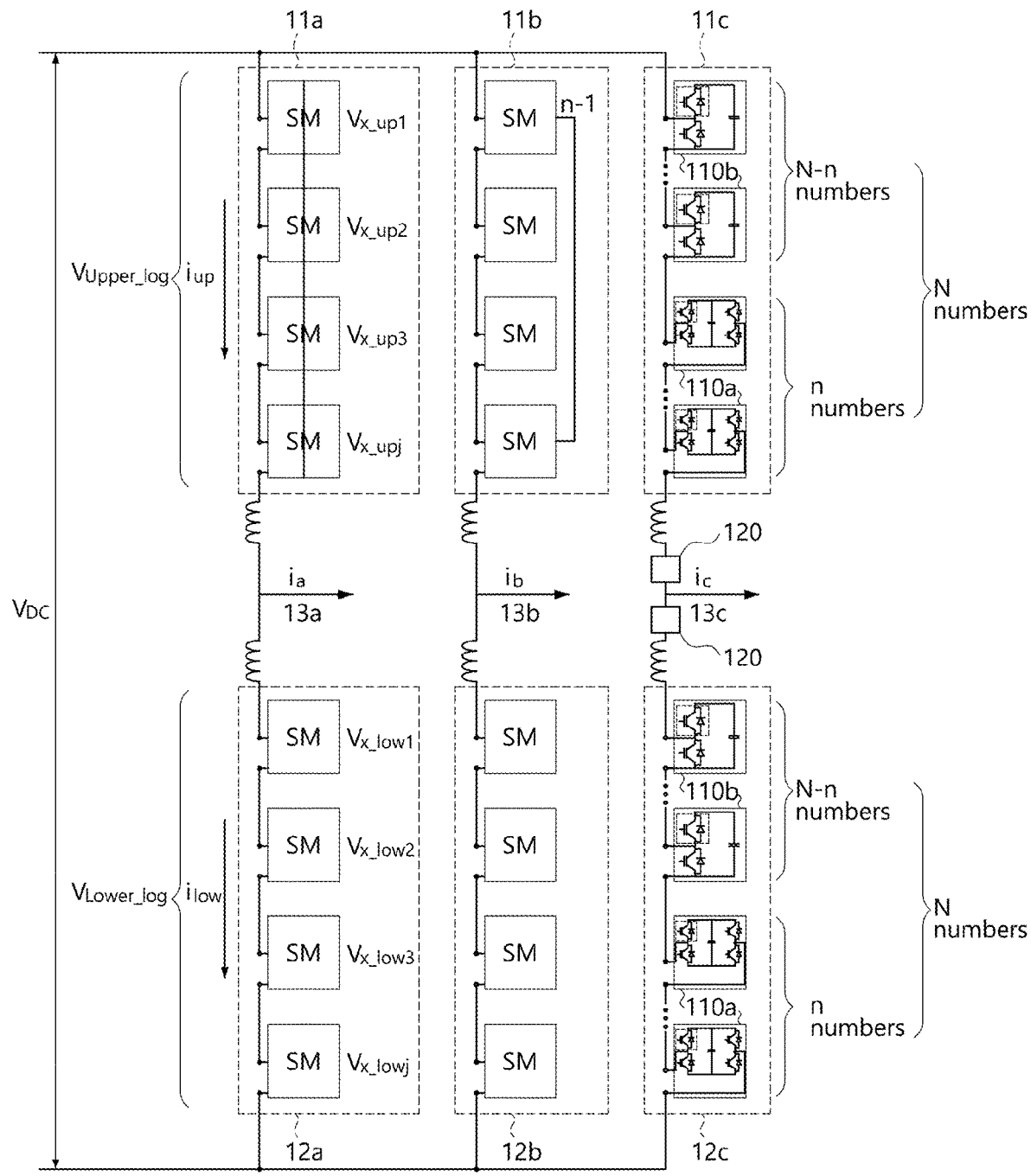
FIG. 4 is a diagram illustrating a configuration of an MMC according to an embodiment of the present invention.

FIG. 4 is a diagram illustrating a configuration of an MMC according to an embodiment of the present invention.

Referring to FIG. 4, according to the present invention, the modular multilevel converter (MMC) is composed of three legs 13a, 13b, and 13c, and six arms 11a, 11b, 11c, 12a, 12b, and 12c, and each arm includes multiple submodules (SMs). These arms are upper arms 11a, 11b, and 11c and lower arms 12a, 12b, and 12c. These converter arms 11a, 11b, 11c, 12a, 12b, and 12c have the same configuration, and thus in the present invention, for convenience of description, one converter arm 11a will be described.

The converter arm 11a includes N (N≥2, an integer) submodules 110a and 110b connected to each other in series, and a circuit opening unit 120 connected to each submodule in series to open a circuit of the converter arm 11a. Operation of these N submodules 110a and 110b and the circuit opening unit 120 is controlled by a controller (not shown).

Here, according to the embodiment, the N submodules 110a and 110b are composed of n (an integer with n<N) submodules 110a including full-bridge circuits and N-n submodules 110b including half-bridge circuits. The half-bridge circuit includes a pair of power semiconductors connected to each other in series and a capacitor connected in parallel to the power semiconductors. The full-bridge circuit includes power semiconductors in two pairs connected to each other in parallel and a capacitor connected in parallel to the power semiconductors. Also, each of the power semiconductors includes a power semiconductor element and a diode connected thereto in inverse-parallel. The power semiconductors may be, for example, IGBTs, FETs, etc., and switching operation thereof is controlled by the controller (not shown).

In the case of the MMC composed as described above, when failure such as a short circuit occurs at the DC side, the fault current (hereinafter, referred to as a DC fault current) flows from the AC side to the DC side through the converter arm 11a of each phase. Therefore, when the DC failure occurs, the arm current flowing in the converter arm 11a is the DC fault current. The DC fault current is the high current that may damage internal elements of each submodule 110a. In the present invention, when the DC failure of the MMC occurs, the circuit of the converter arm 11a is opened to block the DC fault current flowing into the converter arm 11a, whereby the converter circuit is protected.

Hereinafter, operation of the MMC and a DC failure blocking method according to the present invention will be described in detail.

Figure 5:
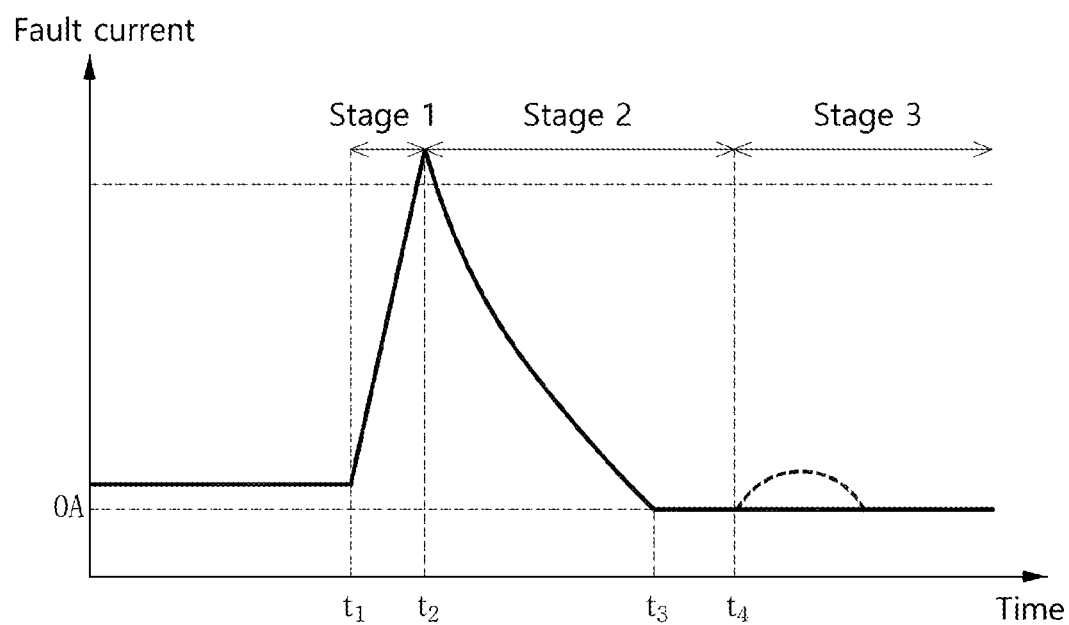
FIG. 5 is a waveform diagram illustrating a DC fault current in a converter arm when DC failure of an MMC occurs according to the present invention.

FIG. 5 is a waveform diagram illustrating an arm current in a converter arm when the DC failure of the MMC occurs according to the present invention.

Referring to FIG. 5, according to the present invention, when the MMC is in a normal state, normal DC current (Is) steadily flows in the converter arm 11a. When the DC failure of the MMC occurs at time t1, the voltage stored in the capacitors 112 and 114 of the full-bridge circuits and the half-bridge circuits of the submodules 110 is discharges and the free-wheeling current flows. Thus, the DC fault current in the converter arm 11a instantaneously increases rapidly until time t2. Here, although the controller (not shown) of the MMC recognizes the DC failure at time t1 and the power semiconductors of the submodules 110 are turned off, in reality the power semiconductors require operation time for off-switching when the DC failure occurs suddenly at time t1 during normal operation. Therefore, during the short period of t1-t2, the DC fault current rapidly increases.

Thereafter, from time t2, the controller turns off the power semiconductors of the submodules 110 of the converter arm 11a, and thus the DC fault current gradually decreases. As described above, the DC fault current in the converter arm 11a gradually decreases and becomes zero when the voltage stored in the capacitors 114 of the n submodules 110a including the full-bridge circuits is lower than the peak value of the three-phase line voltage at the AC side (at time t3). Even if the number of submodules 110a including the full-bridge circuits is reduced, the period (t3 to t4) in which the DC fault current becomes zero is present. That is, when there is at least one submodule 110a including the full-bridge circuit, at least a particular time (T) (the period of t3 to t4) in which the DC fault current becomes zero is present. Here, the length of the particular time (T) in which the DC fault current in the converter arm 11a becomes zero is proportional to the number (n) of submodules 110a including the full-bridge circuits. The number (n) of submodules 110a including the full-bridge circuits is preferably set in such a manner that the particular time (T) is longer than the operation time of the circuit opening unit 120. The reason therefor is that the circuit opening unit 120 operates when the DC fault current in the converter arm 11a is zero. That is, while no current flows in the converter arm 11a, the circuit opening unit 120 is operated such that the circuit of the converter arm 11a is opened, whereby the operation time of the circuit opening unit 120 is secured. Therefore, as described above, since the length of the particular time (T) (the period of t3 to t4) in which no DC fault current flows in the converter arm 11a is proportional to the number of submodules 110a including full-bridge circuits, in the present invention, it is important to determine the number (n) of submodules 110a including full-bridge circuits implemented in the converter arm 11a in such a manner that the length of the particular time (T) is longer than the operation time of the circuit opening unit 120.

As described above, within the particular time (T) of the period of t3 to t4 in which the DC fault current in the converter arm 11a becomes zero, the circuit opening unit 120 is operated by the controller such that the circuit of the converter arm 11a is opened. Here, the circuit opening of the converter arm 11a preferably includes disconnecting, isolating, or separating the lines that make up the converter arm 11a. Also, in another embodiment, the arm current flowing in the converter arm 11a or the DC fault current may be blocked from flowing, which may include blocking the arm current or the DC fault current by disconnecting, isolating, or separating the lines of the converter arm 11a.

Here, according to the present invention, compared to a conventional MMC which does not include the circuit opening unit 120, the MMC provides a very important operation and effect, which will be described in detail. In the case of the conventional MMC including only the submodule having the full-bridge circuit rather than the circuit opening unit, the fault current indicated by the dotted line occurs after time t4 as shown in FIG. 5 and flows to the submodule of the MMC. The fault current occurs when the charging voltage stored in the capacitor of the submodule including the full-bridge circuit is lower than the peak value of the three-phase line voltage at the AC side. When the three-phase AC fault current is supplied from an AC side system, the peak value of the fault current appears at a phase of 120 degrees such that the peak value of the three-phase line voltage is higher than the charging voltage of the submodule. Therefore, even if the number of submodules including full-bridge circuits is reduced, the fault current is present as shown in stage 3 of FIG. 5.

In contrast, according to the present invention, the fault current occurring in the conventional method is fundamentally blocked. That is, according to the present invention, the MMC includes the circuit opening unit 120, and when the DC fault current in the converter arm 11a is zero, the circuit opening unit 120 is operated to open the circuit of the converter arm 11a. Thus, unlike the conventional case, the fault current does not flow in the converter arm 11a, and the current remains at zero as indicated by the solid line (A) in FIG. 5.

According to the present invention, the circuit opening unit 120 preferably includes, for example, a disconnector that disconnects the circuit when the DC fault current in the converter arm 11a is zero. It is desirable to use an ultra-fast disconnector with a short operation time to quickly disconnect the circuit when the DC fault current is zero. The disconnector is a switch that operates while no current flows in the circuit, and thus in the present invention, it is important to maintain the current at zero during the operation time of the disconnector by adjusting the number of submodules including full-bridge circuits.

Figure 6:
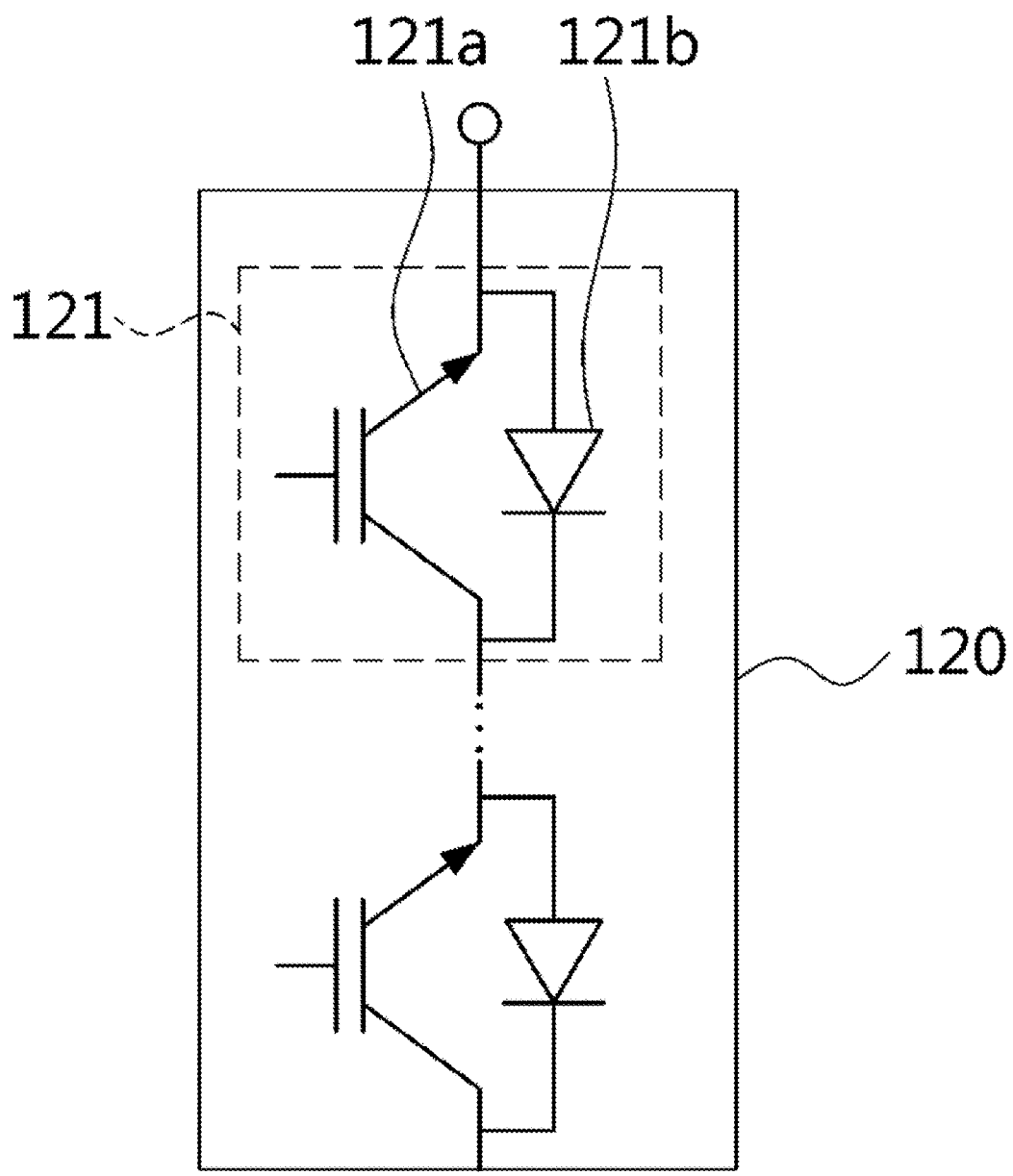
FIG. 6 is a diagram illustrating an example of a configuration a circuit opening unit according to another embodiment of the present invention.

FIG. 6 is a diagram illustrating an example of a configuration of a circuit opening unit according to another embodiment of the present invention.

Referring to FIG. 6, according to another embodiment of the present invention, the circuit opening unit 120 includes one or more power semiconductors 121. It is important that the power semiconductors 121 are placed in the reverse direction to the power semiconductors in the submodules 110 so as to block the DC fault current supplied from the AC side. The power semiconductor 121 includes a power semiconductor element 121*a* connected in inverse-series to the submodules 110 as described above and a diode 121*b* connected in inverse-parallel to the power semiconductor element 121*a*. When the DC failure of the MMC 110 occurs, the controller turns off the power semiconductors of the full-bridge circuits and the half-bridge circuits of the submodules 110. Thus, the DC fault current in the converter arm 11*a* gradually decreases and becomes zero. Here, the power semiconductor 121 of the circuit opening unit 120 is turned off by the controller such that the DC fault current is blocked. Here, unlike an example in which the circuit opening unit 120 is implemented with the disconnector, in the case where the circuit opening unit 120 is implemented with the power semiconductor 121, when the DC fault current is not zero but is within a preset range from zero, the power semiconductor 121 may be turned off. This is because the disconnector is a switch element operable when no current flows in the circuit, so the current of zero is required, but the power semiconductor switch may be turned off to block the current even though the low current flows rather than the current of zero.

In the meantime, although not shown in the drawings, according to still another embodiment of the present invention, the circuit opening unit 120 may include the disconnector and one or more power semiconductors 121 connected to the disconnector in series. The circuit opening unit 120 is implemented by connecting the disconnector and the power semiconductor in series such that the performance of blocking the DC fault current may be enhanced.

Hereinafter, the DC failure blocking method according to the configuration of the MMC will be described. First, according to the present invention, the MMC includes the multiple converter arms as described above, and each converter arm includes N (N≥2, an integer) submodules 110 connected to each other in series and the circuit opening unit 120 connected to the N submodules in series to open the circuit of the converter arm. Here, the N submodules 110 are n (n<N) submodules including full-bridge circuits and the remaining N-n submodules including half-bridge circuits.

When the DC failure of the MMC occurs, the controller (not shown) recognizes the DC failure at step S101, and the power semiconductors of the full-bridge circuits and the half-bridge circuits configured in respective submodules 110 are turned off at step S103. Then, when the DC fault current in the converter arm is zero or within the preset range from zero, the controller operates the circuit opening unit 120 to open the circuit of the converter arm and to block the DC fault current caused by the DC failure at step S105. Here, the circuit opening unit 120 operates during the particular time (T) in which the DC fault current in the converter arm remains at zero or within the preset range from zero. Also, the particular time (T) is proportional to the number (n) of submodules including full-bridge circuits, and the number (n) of submodules including full-bridge circuits is set in such a manner that the particular time (T) is longer than the operation time of the circuit opening unit 120. This is because when the circuit opening unit 120 is implemented with the disconnector, the current flowing in the converter arm is required to remain at zero. The circuit opening unit 120 may be implemented with one or more power semiconductors 121 connected to each other in series, or as another example, with the disconnector and one or more power semiconductors 121 connected to each other in series.

As described above, according to the present invention, each converter arm of the MMC is composed of the multiple submodules and the circuit opening unit, and the multiple submodules are a combination of submodules including half-bridge circuits and submodules including full-bridge circuits. Accordingly, when the DC failure occurs, the DC fault current flowing into the converter arm is blocked. Further, compared to the MMC composed of only submodules including full-bridge circuits, switching loss may be significantly reduced and the costs may be reduced. Also, the present invention partially applies submodules including full-bridge circuits to enable the current flowing in the converter arm to be zero, such that the circuit opening unit 120 may be implemented with the disconnector.

In the above description, although a description has been made such that all components constituting embodiments of the present invention are combined into a single component or are operated with the components being combined with each other, the present invention is not limited to those embodiments. That is, within the scope of the present invention, one or more of all components may be selectively combined and operated. Further, it should be understood that terms such as "comprise", "include", or "have" are merely intended to indicate that the corresponding component is internally present, unless a description to the contrary is specifically pointed out in context, and are not intended to exclude the possibility that other components may be additionally included. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present invention.

The above description is merely intended to exemplarily describe the technical spirit of the present invention, and those skilled in the art will appreciate that various changes and modifications are possible without departing from the essential features of the present invention. Therefore, the embodiments disclosed in the present invention are not intended to restrict the technical spirit of the present invention and are merely intended to describe the present invention, and the scope of the present invention is not limited by those embodiments. The protection scope of the present invention should be defined by the accompanying claims, and the technical spirit of all equivalents thereof should be construed as being included in the scope of the present invention.

The invention claimed is:

1. A modular multilevel converter (MMC) comprising a converter arm, wherein the converter arm comprises:
   N submodules connected to each other in series, N being an integer equal to or greater than 2; and
   a circuit opening unit connected to the N submodules in series to open a circuit of the converter arm,
   wherein the N submodules have n submodules including full-bridge circuits and N-n submodules including half-bridge circuits, n being less than N,
   wherein, when DC failure in the MMC occurs, power semiconductors in the full-bridge circuits and the half-bridge circuits of the N submodules are configured to be turned off during a particular period of time (T) such that a DC fault current caused by the DC failure occurred when a short circuit occurs at a DC side is zero, wherein the circuit opening unit includes two or more power semiconductors connected to each other in series such that a current unidirectionally passes through the power semiconductors of the circuit opening unit when all of the power semiconductors of the circuit opening unit are tuned on, and the power semiconductors of the circuit opening unit are placed in a reverse direction to the power semiconductors of the N submodules, wherein when the DC fault current in the converter arm is within a preset range from zero, the power semiconductors of the circuit opening unit are turned off, such that the DC fault current in the converter arm is blocked, wherein the circuit opening unit is configured to open the circuit of the converter arm to prevent the DC fault current when a voltage stored in capacitors of the full-bridge circuits is less than a peak value of a three-phase line voltage at an AC side of the MMC, and wherein the number (n) of the submodules including the full-bridge circuits is proportional to the particular period of time (T), and the number (n) of the submodules including the full-bridge circuits is set in such a manner that the particular period of time (T) is longer than an operation time of the circuit opening unit.

2. The modular multilevel converter of claim 1, wherein the submodules including the full-bridge circuits are configured such that the number (n) of the submodules including the full-bridge circuits is set in such a manner that the voltage stored in the capacitors of the full-bridge circuits is less than the peak value of the three-phase line voltage at the AC side of the MMC.

3. The modular multilevel converter of claim 1, wherein the circuit opening unit is configure to operate when no current flows through the circuit of the converter arm.

4. A DC failure blocking method for a modular multilevel converter (MMC) including a converter arm, the converter arm having: N submodules connected to each other; and a circuit opening unit connected to the N submodules in series to open a circuit of the converter arm, wherein the N submodules have n submodules having full-bridge circuits and N-n submodules having half-bridge circuits, N being an integer equal to or greater than 2, n being less than N, the circuit opening unit including two or more power semiconductors connected to each other in series such that a current unidirectionally passes through the power semiconductors of the circuit opening unit when all of the power semiconductors of the circuit opening unit are tuned on, and the power semiconductors of the circuit opening unit being placed in a reverse direction to power semiconductors in the N submodules, the method comprising:

recognizing, by a controller, DC failure of the MMC;

turning off, by the controller, the power semiconductors in the full-bridge circuits and the half-bridge circuits of the N submodules;

operating, by the controller, the circuit opening unit to open the circuit of the converter arm to block a DC fault current caused by the DC failure such that the DC fault current in the converter arm is zero or within a preset range from zero; and turning off, by the controller, the power semiconductors of the circuit opening unit to block the DC fault current in the converter arm when the DC fault current in the converter arm is within the preset range from zero, wherein the operating of the circuit opening unit includes operating, by the controller, the circuit opening unit to open the circuit of the converter arm to prevent the DC fault current when a voltage stored in capacitors of the full-bridge circuits is less than a peak value of a three-phase line voltage at an AC side of the MMC, wherein the circuit opening unit operates during a particular period of time (T) in which the DC fault current in the converter arm remains at zero or within the preset range from zero, and wherein the particular period of time (T) is proportional to the number (n) of the submodules including the full-bridge circuits, and the number (n) of the submodules including the full-bridge circuits is set in such a manner that the particular period of time (T) is longer than an operation time of the circuit opening unit.

5. The method of claim 4, wherein the circuit opening unit is configure to operate when no current flows through the circuit of the converter arm.

* * * * *